Figure 1:
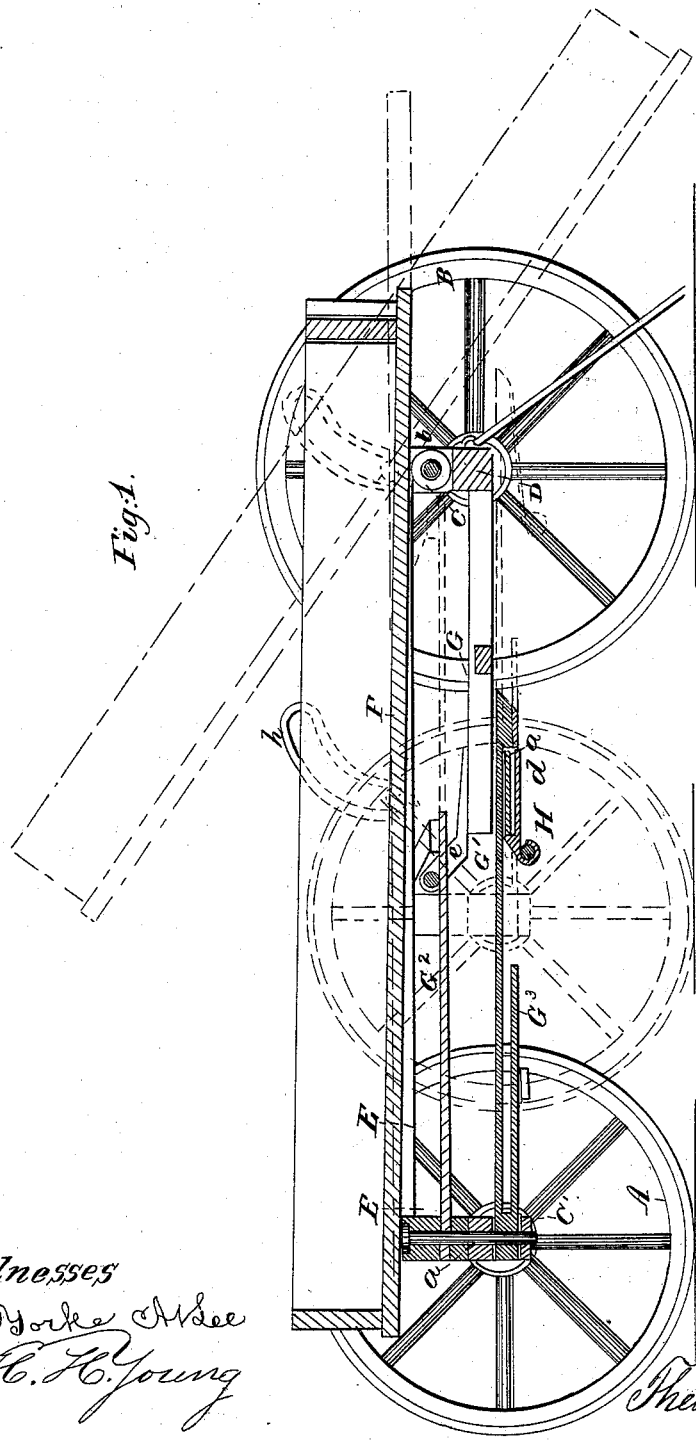

3 Sheets—Sheet 1.

T. BAILEY.
Dumping-Wagon.

No. 23,147. Patented Mar. 8, 1859.

Witnesses
G. Yorke McGee
H. H. Young

Inventor
Theodore Bailey

T. BAILEY.
Dumping-Wagon.
No. 23,147.
3 Sheets—Sheet 2.
Patented Mar. 8, 1859.
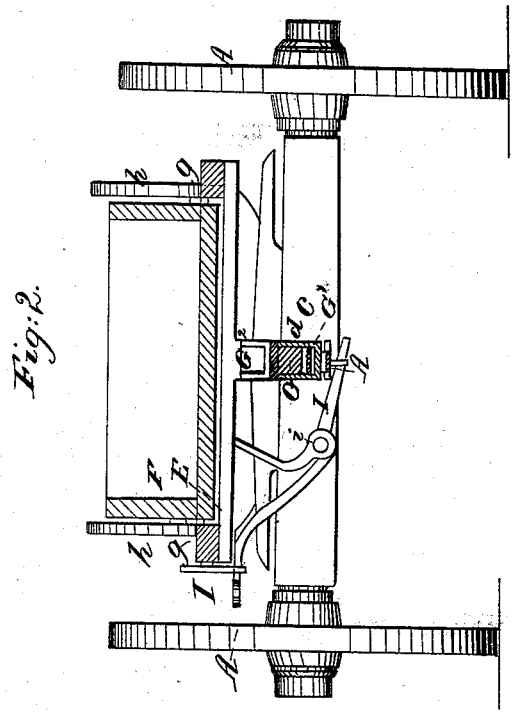
Witnesses.
G. Yorke Atlee
H. H. Young
Inventor.
Theodore Bailey 3 Sheets—Sheet 3.
T. BAILEY.
Dumping-Wagon.
No. 23,147.                                  Patented Mar. 8, 1859.
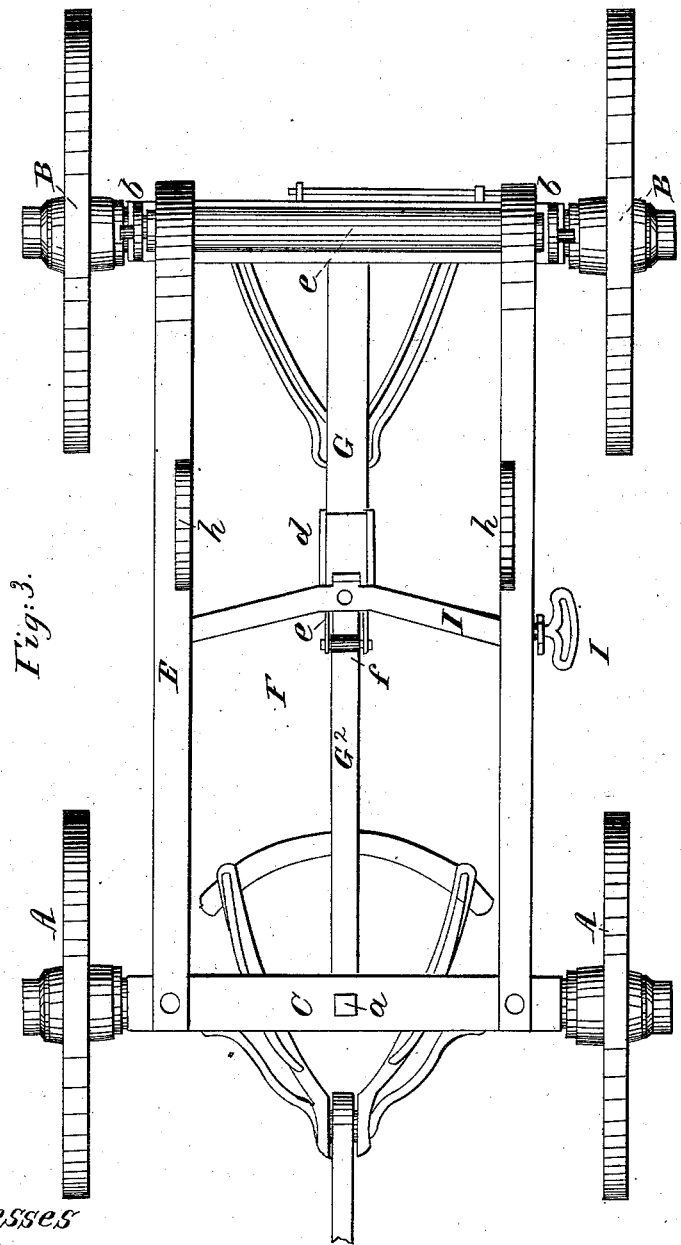
Witnesses
G. Yorkie McLee
H. H. Young
Inventor
Theodore Bailey

UNITED STATES PATENT OFFICE.

THEODORE BAILEY, OF FRIENDSHIP, VIRGINIA.

DUMPING-WAGON.

Specification of Letters Patent No. 23,147, dated March 8, 1859.

*To all whom it may concern:*

Be it known that I, THEODORE BAILEY, of Friendship, in the county of Fairfax and State of Virginia, have invented a new and useful Improvement in Dumping-Wagons; and I do hereby declare that the following is a full, clear, and exact description of the same, reference being had to the accompanying drawings, forming a part of this specification, in which—

Figure 1, is a vertical longitudinal section of a dumping wagon constructed according to my improvement. Fig. 2, is a vertical transverse section of the same. Fig. 3, is a plan of the same, the body being removed.

Similar letters of reference, in each of the several figures indicate corresponding parts.

My invention consists 1st, in a wagon which dumps itself by reason of the approximation of its wheels, whether the approximation of the wheels is caused by the back action of the team or by other means.

My invention consists 2nd, in providing for the approximation of the wheels of a wagon, by making the reach in two sections and so coupling said sections together and combining with the same, the frame, body, and hind and front axles, that one shall be capable under certain conditions hereinafter specified of sliding within or over the other, and in its movement carry back the frame, pivoted body of the wagon and front axle and its attachments independently of the other section of the reach and the hind axle and its attachments, to a position which will insure an automatic tilting of the body and a consequent dumping of the load contained in the same.

My invention consists 3rd, in the combination of a spring catch or lock with the divided reach, or other device which allows the wheels of the wagon to approximate when it is desired to dump the load contained in the body; whereby the body of the wagon, when the wagon is propelled forward, shall be locked securely, but when the wagon is chocked at the rear or held down by the load in the body and it is a proper time to dump the load, the body may be unlocked, and by the backing of the team or other cause, be moved back until the axes or pivots on which it swings assume a position which will allow it to tilt by reason of the superior gravity of its rear end, and dump the load.

To enable others, skilled in the art, to make and use my invention, I will proceed to describe its construction and operation.

A, A, represent the front and B, B, the hind wheels of the wagon. C, D, the axles of the same. E, the frame on which the body F, rests and to which it is hung so as to tilt and dump whatever it may contain, as hereinafter specified. The front end of the frame E, is secured by the king-bolt $a$, to the front axle C, while its rear end simply rests, between lateral guides $b$, $b$, on a friction roller $c$, of the hind axle, as shown.

G, G', G$^2$, G$^3$, represent the two sections of the reach. The rear section G, is coupled to the front section G', G$^2$, G$^3$, by a guide box $d$, and a strap $e$, which latter is furnished with a friction roller $f$, as shown.

The body F, is hung to the frame E, by means of short journals $g$, $g$, and curved slotted irons $h$, $h$, as shown. By thus hanging the body, it is capable of tilting and dumping the load as illustrated in red when the wheels approximate, and, in case of necessity, is also allowed a chance of assuming a nearly vertical position and thus effect a perfect dumping of its contents.

H, is a spring catch for holding the two sections of the reach in the condition shown in black lines in Figs. 1 and 3 when the wagon is being propelled forward and thus preventing the moving back of the body frame and front axle and its attachments until it is desired to dump the load. This catch is attached to the underside of the part G', of the front section of the reach and moves back with it. When the wagon is in the condition shown in black, this catch passes up in front of the coupling guide box $d$, and prevents a possibility of the wheels approximating. I, is a foot or hand lever connected to the spring catch and serving for releasing the same whenever it is desired to dump the load. This lever has its fulcrum at $i$, and extends out laterally beyond the side of the body of the wagon so that it may be operated conveniently by foot or hand. The gravity of its outer end tends to retain the spring catch in action, and therefore it is necesary in order to release the catch to elevate the lever.

Operation: The operation may already have been made evident, but I will in order to make it more perfectly understood, give it here. The wagon to be loaded, of course, is adjusted as shown in black, having been propelled to the place it is desired to dump its load, and chocked in the ordinary manner. The spring catch H, is depressed by raising the lever I. The team is now backed until the front axle and all its attachments assume the position shown in red. As soon as this has occurred, the body tilts, as illustrated in red, by reason of the superior gravity of its rear end, and dumps its load, and in case the load should not be perfectly dumped by its assuming the position stated, by continuing to back the team, the short journals $g$, $g$, will rise to the top of the curved slots of the irons $h$, $h$, and thus allow the body to assume a nearly perpendicular position or a position which will insure the discharge of its contents. The team is now propelled forward and in consequence thereof, the front wheels will move from the hind wheels and thereby cause the body to assume its proper horizontal position. As soon as this occurs, the spring catch will rise in front of the coupling guide box $d$, and prevent the body moving back until it is again desired to dump a load, or until the lever I, is elevated.

The utility of this invention lies 1st, in its rendering practicable the dumping of a wagon by the backing of the team. 2nd, in its ready application to old wagons, for by simply dividing an old reach, at its center and throwing away its front portion its application can be effected. 3rd, in its rendering a farm wagon capable of serving the office of a two wheeled cart and thus saving the expense of such a cart and relieving the horse of much of the weight which necessarily comes upon him when two wheels only support the body, and likewise of that injurious upward jerk which is experienced in dumping a two wheel cart.

What I claim as my invention and desire to secure by Letters Patent, is—

1. A wagon which dumps itself by the approximation of the wheels, as set forth.

2. The combination of a spring catch H, with the divided reach, substantially as and for the purposes set forth.

THEODORE BAILEY.

Witnesses:
G. YORKE AT LEE,
K. W. FENWICK.